July 26, 1966  JAMES E. WEBB  3,263,171
ADMINISTRATOR OF THE NATIONAL AERONAUTICS
AND SPACE ADMINISTRATION
MICRO CURRENT MEASURING DEVICE USING PLURAL
LOGARITHMIC RESPONSE HEATED FILAMENTARY
TYPE DIODES
Filed March 5, 1962

CONRAD S. JOSIAS
INVENTOR.

BY
ATTORNEYS.

United States Patent Office 3,263,171
Patented July 26, 1966

3,263,171
MICRO CURRENT MEASURING DEVICE USING PLURAL LOGARITHMIC RESPONSE HEATED FILAMENTARY TYPE DIODES
James E. Webb, Administrator of the National Aeronautics and Space Administration, with respect to an invention of Conrad S. Josias
Filed Mar. 5, 1962, Ser. No. 180,392
2 Claims. (Cl. 324—132)

This invention relates to electrical current measuring apparatus and, more particularly, to improvements therein.

In the course of investigating different types of radiations it has become necessary to measure both positive and negative currents on the order of $10^{-13}$ amperes and over a range of $10^{-13}$ to $10^{-6}$ amperes. The commonly accepted arrangement for measuring a wide range of currents is to use a number of different current measuring circuits, each of which covers a different portion of the range, and to switch therebetween. Furthermore, the measurement of currents within the range specified require some very delicate apparatus to be employed. When these measurements are made under laboratory conditions the usually accepted apparatus may possibly be suitable. However, where these measurements are to be made in environments such as in outer space, where minimal weight, minimal complexity of apparatus, and ruggedness are of extreme importance, the commonly accepted techniques are not suitable.

Accordingly, an object of this invention is the provision of a novel circuit arrangement for measuring currents in the micro micro ampere range.

Yet another object of this invention is the provision of a rugged arrangement for measuring current to the micro micro ampere range.

Still another object of the present invention is the provision of a simple, non-switching arrangement for measuring a wide range of currents in the micro micro ampere range.

These and other objects of this invention may be achieved by employing two vacuum tube diodes of the sub-miniature thermionic type (with filamentary cathodes) that are effectively connected cathode to diode to produce a circulating current, which is small compared to the currents to be measured. The source of the currents to be measured is connected to the two diodes and a meter is connected across the diodes for measuring the voltage drop due to the current to be measured. The diodes provide a logarithmic processing operation, that is, the voltage varies in accordance with the logarithm of the current being measured. Accordingly, the circuit has the ability to logarithmically compress both positive and negative currents in the micro micro ampere range being measured.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Upon investigation it has been found that a substantially linear relationship exists between the logarithm of current applied to a filamentary diode and the voltage existing thereacross when the currrent is on the order of micro amperes or micro micro amperes. A suitable diode which exhibits these characteristics is, for example, the type 5886 manufactured by the Raytheon Manufacturing Company. Advantage of this phenomenon is taken in accordance with this invention in order to provide a circuit which can measure both positive and negative currents over a range of plus or minus seven current decades.

Figure 1:
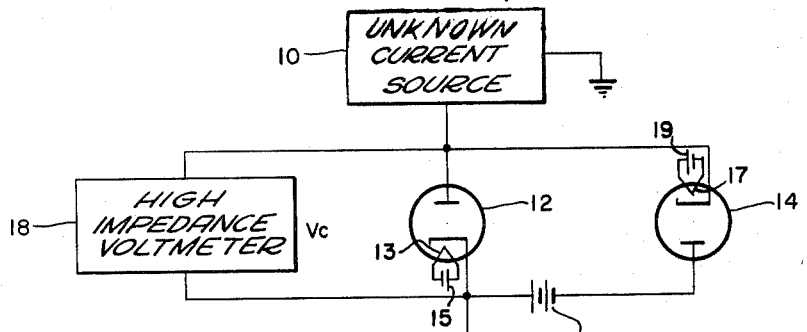
FIGURE 1 is a circuit diagram of an embodiment of the invention.

Referring now to FIGURE 1, there may be seen a circuit diagram of an embodiment of this invention. An unknown current source 10 is connected to the junction of the anode of a first diode 12 and the cathode of a second diode 14. A voltage source 16 is connected between the cathode of the first diode 12 and the anode of the second diode 14. A high impedance voltmeter is connected across the substantially parallel connected diodes. The diode 12 has a filament cathode 13 connected to a source of constant heating potential 15. The diode 14 has a filamentary cathode 17 connected to a constant source of heating potential 19.

Figure 2:
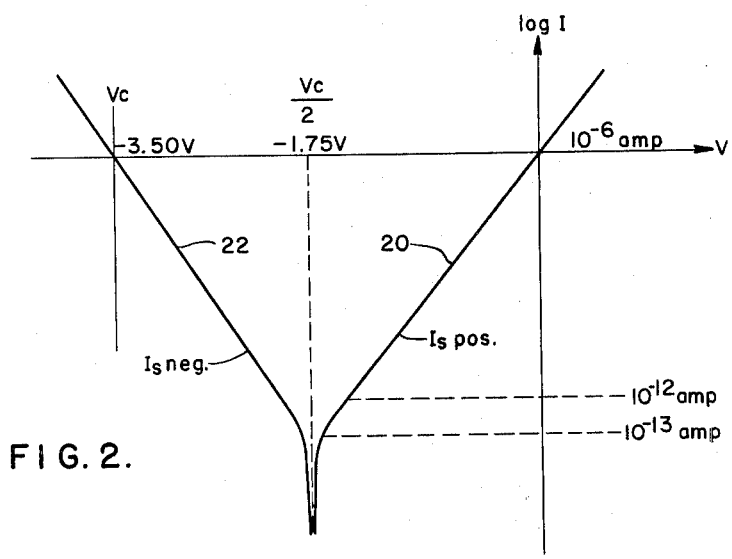
FIGURE 2 is a diagram of the characteristics of the circuit shown in FIGURE 1.

FIGURE 2 is a diagram of the characteristics of the circuit shown in FIGURE 1. It will be referred to in explaining the operation of the circuit shown in FIGURE 1. In FIGURE 2 the two curves 20, 22 respectively show the characteristics of the circuit for positive and negative current flow from the unknown current source 10. If a filamentary diode has its anode connected to its cathode, it is found that a current flows therethrough due to the electrons emitted from the heated filament of the diode. Were the diode 14 connected directly across the diode 12 without the presence of the battery 16, then the diode 14 would essentially constitute a short circuit for the diode 12 and vice versa, and a circulating currrent would flow which would have a sufficiently high value to mask the current desired to be measured or any changes thereof. Accordingly, the battery 16 is inserted to effectively constitute a retarding bias to minimize the current flow due to electron flow in the tubes 12 and 14.

By way of example, in an embodiment of the invention using the previously indicated tube types a battery having a voltage of 3½ volts was used to back bias the diodes and thereby reduce the circulating current. The battery voltage amplitude is chosen as the one which will reduce the circulating current below the smallest value which it is contemplated will be measured. This can be easily determined by measurement. Thus the smallest value contemplated for measurement in an embodiment of the invention which was built was on the order of $10^{-13}$ amperes, and the diodes which were used were type 5886 manufactured by the Raytheon Manufacturing Company.

With a battery voltage on the order of 3.5 volts in the circuit and with no current being applied from the unknown current source, both diodes are back biased so that the circulating current through the diodes is on the order of $10^{-13}$ amperes. The voltage which is measured by the high impedance voltmeter 18 which is directly connected across only one of the two diodes which are connected in series across the battery is −1.75 volts, or half of the battery voltage. Assume now that positive current flows from the unknown current source 10. This causes an increase in current flow through diode 12 and a corresponding decrease in current flow through diode 14. For example, assume that the current flow from the unknown source is on the order of $+10^{-12}$ amperes, then the current in tube 12 will increase to approximately $10^{-12}$ amperes (along the characteristic curve 20) until the voltage across diode 12 is approximately −1.50 volts. The current which flows in tube 14 will decrease to an amount which yields a voltage drop thereacross on the order of two volts. The resultant of the voltages which is measured by the high impedance voltmeter is $-1.5$ volts.

Assume now that a positive current on the order of $10^{-6}$ amperes flows from the unknown current source, the current flowing through tube 12 will increase to approximately $10^{-6}$ amperes and the voltage read thereacross, as may be seen from the voltage-current characteristic curve 20, will be substantially zero. The current through tube 14 will decrease until the value of the voltage across the tube 14 is $-3.50$ volts. Therefore the voltage measured by the high impedance voltmeter 18 will be substantially zero volts for this value of current flow from the unknown source.

For negative values of current flow from the current source, the circuit characteristics are as shown by the curve 22. Assume the current flowing from the current source has a value of $-10^{-12}$ amperes, then the current flow through the tube 14 will increase and through the tube 12 will decrease until the voltage which is measured by the high impedance voltmeter is on the order of $-2$ volts. When the negative currrent input is on the order of $-10^{-6}$ amperes, the current flow through the tubes 12 and 14 is such that the voltage measured by the high impedance voltmeter 18 is $-3.5$ volts.

From the foregoing description it will be seen that the system operates to produce voltage readings along the curve 20 in response to positive current input and along the curve 22 in response to negative current input. For a current range from $+10^{-6}$ amperes to $+10^{-12}$ amperes the output voltage will vary from $-1.75$ volts down to zero volts, and for currents of from $-10^{-12}$ amperes down to $-10^{-6}$ amperes the output voltage will vary from $-2$ volts down to $-3.5$ volts. In other words, considering that the high impedance voltmeter 18 reads only the voltage across diode 12 applied positive current, (one which flows through diode 12 to ground) reduces the negative voltage read by the voltmeter across diode 12. An applied negative current (one which flows through 14 and battery 16, or alternatively expressed, from ground through battery 16 through diode 14) increases the negative voltage read by the voltmeter.

Figure 3:
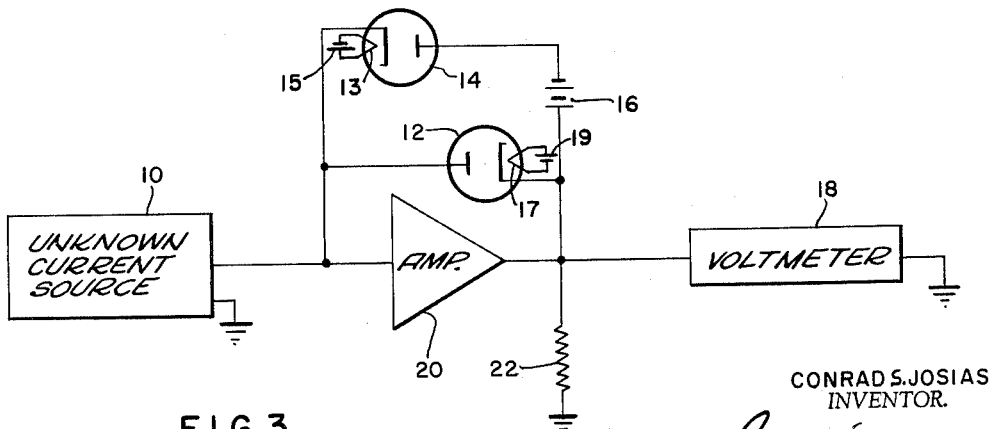
FIGURE 3 is a preferred arrangement of the circuit for the invention.

A preferred arrangement for the embodiment of the invention is shown in FIGURE 3. Similar functioning structures are given the same reference numerals as are employed in FIGURE 1. The two-diode circuit is preferably connected across a high impedance operational amplifier 20 in order to improve speed of response and to force the measurement node to a virtual ground thereby minimizing input leakage currents. An input load-resistor 22 is connected between the output of the amplifier and ground. The high gain amplifier 20 is of the inverting type which produces an output having the opposite phase of its input. Accordingly, the voltage measured by the voltmeter 18 with positive or negative current variations, which are on the order of those described, will be over the same voltage range effectively as determined by the value of the bucking voltage source 16 but of opposite polarity. The voltmeter 10 here may be an ordinary meter instead of a vacuum tube voltmeter, as is required in the embodiment of FIGURE 1.

There has, accordingly, been shown and described herein a novel and useful detector circuit which measures both positive and negative currents from a single source, and which is capable of handling a current range of positive or negative currents on the order of ten million to one.

I claim:
1. A bipolar current measuring apparatus for measuring currents in the micro-micro ampere range comprising, a first and a second diode of a type having an anode and a heated filamentary cathode, whereby a current flow may be established through the diodes in response to filamentary cathode heating in the absence of anode potential, said diodes being further characterized in that each possess a logarithmic response characteristic, means connecting the anode of said first diode directly to the cathode of said second diode, a potential source means directly connected between the cathode of said first diode and the anode of said second diode for reducing to a preselected value in the micro micro ampere range a flow of current established through the diodes in response to filamentary cathode heating, a source of input current of a value to be measured, means directly connecting said source of input current in series with the anode and the cathode of said first diode, and a high impedance voltage measuring means having the junction terminals thereof directly connected to the anode and cathode of said first diode, whereby the high impedance voltage measuring means may be employed as an indicator in measuring the value of the input current.

2. The bipolar current measuring device as defined in claim 1 wherein said high impedance measuring means comprises a direct current phase inverting amplifier including an input and an output terminal and having the input terminal thereof connected directly to the anode of said first diode and the output terminal thereof connected directly to the cathode of said first diode, and a voltage measuring means connected to the output terminal of said amplifier.

References Cited by the Examiner
UNITED STATES PATENTS

| | | | |
|---|---|---|---|
| 2,079,485 | 5/1937 | Bousman | 324—132 |
| 2,583,130 | 1/1952 | Wrolson | 324—132 |
| 2,916,702 | 12/1959 | Bigelow | 324—132 |
| 3,037,129 | 5/1962 | Bel | 328—145 |
| 3,094,670 | 6/1963 | Batchelor | 324—123 |

WALTER L. CARLSON, *Primary Examiner.*

FREDERICK M. STRADER, *Examiner.*

R. V. ROLINEC, *Assistant Examiner.*